United States Patent
Hoteit et al.

(10) Patent No.: US 8,916,128 B2
(45) Date of Patent: Dec. 23, 2014

(54) INTEGRATED OXIDATION, REDUCTION AND GASIFICATION METHOD FOR CHEMICAL LOOPING SYNGAS AND ENERGY PRODUCTION

(75) Inventors: Ali Hoteit, Paris (FR); Florent Guillou, Ternay (FR); Ann Forret, Longes (FR); Thierry Gauthier, Brignais (FR)

(73) Assignees: IFP Energies nouvelles, Rueil-Malmaison Cedex (FR); Total SA, Coubevoie (FR)

( * ) Notice: Subject to any disclaimer, the term of this patent is extended or adjusted under 35 U.S.C. 154(b) by 43 days.

(21) Appl. No.: 13/146,982

(22) PCT Filed: Jan. 28, 2010

(86) PCT No.: PCT/FR2010/000069
§ 371 (c)(1),
(2), (4) Date: Jul. 29, 2011

(87) PCT Pub. No.: WO2010/086529
PCT Pub. Date: Aug. 5, 2010

(65) Prior Publication Data
US 2011/0303875 A1    Dec. 15, 2011

(30) Foreign Application Priority Data
Jan. 30, 2009 (FR) ..................... 09 00390

(51) Int. Cl.
| | | |
|---|---|---|
| *C01B 3/24* | (2006.01) | |
| *C01B 3/48* | (2006.01) | |
| *C10J 3/72* | (2006.01) | |
| *C10K 3/04* | (2006.01) | |
| *C01B 3/42* | (2006.01) | |

(52) U.S. Cl.
CPC ........... *C01B 3/42* (2013.01); *C01B 2203/0283* (2013.01); *C01B 2203/84* (2013.01); *C10J 2300/1659* (2013.01); *C01B 2203/86* (2013.01); *C01B 3/48* (2013.01); *C10J 3/725* (2013.01); *C01B 2203/1058* (2013.01); *C01B 2203/0233* (2013.01); *C01B 2203/1247* (2013.01); *C01B 2203/1041* (2013.01); *C10K 3/04* (2013.01); *C01B 2203/1052* (2013.01); *C01B 2203/1076* (2013.01)

USPC .......................................................... 423/650

(58) Field of Classification Search
USPC ....................................................... 252/373
See application file for complete search history.

(56) References Cited

U.S. PATENT DOCUMENTS

| | | | |
|---|---|---|---|
| 4,272,399 A * | 6/1981 | Davis et al. ................... 252/373 |
| 2003/0029088 A1 | 2/2003 | Lyon | |
| 2005/0175533 A1* | 8/2005 | Thomas et al. ............... 423/657 |
| 2007/0082089 A1 | 4/2007 | Krammer et al. | |

FOREIGN PATENT DOCUMENTS

| | | |
|---|---|---|
| EP | 1 933 087 A2 | 6/2008 |
| FR | 2 850 156 A1 | 7/2004 |

OTHER PUBLICATIONS

Pilar Lisbona et al., Enhanced coal gasification heated by unmixed combustion integrated with an hybrid system of SOFC/GT, International Journal of Hydrogen Energy, 2008, pp. 5755-5764, vol. 33, XP-002549189.

Liangshih Fan et al., Utilization of chemical looping strategy in coal gasification processes, Particuology, 2008, pp. 131-142, vol. 6.

* cited by examiner

*Primary Examiner* — Melvin C Mayes
*Assistant Examiner* — Kenneth Vaden
(74) *Attorney, Agent, or Firm* — Antonelli, Terry, Stout & Kraus, LLP.

(57) ABSTRACT

The invention relates to an energetically self-sufficient syngas production method in at least one chemical loop. The chemical loop involves at least three distinct oxidation, reduction and gasification reaction zones:

1. at least one air-supplied oxidation reaction zone R1, referred to as "air" reactor, where the reaction of oxidation of the metallic oxides takes place after reduction,
2. at least one combustion reduction reaction zone R2, referred to as "fuel" reactor, where the feed combustion reaction takes place in the presence of the oxygen present in the metallic oxides,
3. at least one gasification reaction zone R3, referred to as "gasification" reactor, for gasification of the solid and/or liquid feeds in order to produce a syngas, said gasification being catalyzed by the at least partly reduced metallic oxides from R2.

11 Claims, 5 Drawing Sheets

INTEGRATED OXIDATION, REDUCTION AND GASIFICATION METHOD FOR CHEMICAL LOOPING SYNGAS AND ENERGY PRODUCTION

FIELD OF THE INVENTION

Chemical Looping Combustion and $CO_2$ Capture

Considering the climate changes observed during the past decades and those predictable in the long term, controlling greenhouse gas emissions is becoming an increasingly strong requirement for all economic sectors, in particular those concerning energy production. One of the various possible ways of controlling greenhouse gas discharge to the atmosphere is carbon capture and sequestration. This option is specially suited in case of a centralized use of fossil energies. The most part of the solutions considered induce a high energy penalty, with an autoconsumption of the order of 20% to 30%.

Among the means allowing $CO_2$ capture in combustion units, chemical looping, under development, which can be categorized as an oxycombustion technique, affords the advantage of producing combustion fumes free of nitrogen from the combustion air.

Thus, assuming that the gas, the solid and the liquid burn completely with oxygen supplied by particles such as metallic oxides, the fumes would only be made up of $CO_2$ and of water vapour which, once cooled below 100° C. and freed of the condensed water, would consist of pure $CO_2$ that can be sequestered.

Chemical looping combustion involves a high potential in terms of energy efficiency and cost reduction. This method avoids the energy penalty linked with the separation of oxygen and air. It is based on the oxygen transfer capacity of some materials such as metallic oxides. An air reactor is used to oxidize the oxygen carriers prepared in form of fine particles that are transferred to a fuel reactor where they are reduced by combustion of the fuel. This method is generally designed and carried out on a pilot scale in form of two fluidized beds exchanging solid streams: the air reactor being then a fast fluidization type reactor at the top of which the oxygen-depleted air stream and the particles are separated by a cyclone, the particles moving down through gravity in the fuel reactor consisting of a dense fluidized bed, where an overflow achieves reinjection of the solids at the bottom of the riser, while the combustion gases essentially consisting of $CO_2$ and $H_2O$ are discharged through the overhead of this dense fluidized bed.

When the oxygen stoichiometry is in excess in relation to the combustion requirements, chemical looping allows to carry out total combustion of the fuel and to produce fumes essentially containing $CO_2$ while maximizing the energy produced. By limiting the oxygen supply, for example by controlling the circulation of the oxidizing masses, it is also possible to achieve partial combustion of the fuel and to produce fumes consisting at least partly of a mixture of CO and $H_2$ which, after downstream treatment and purification, can serve as the feed in conversion or energy production processes. This partial combustion limits the energy production but it thereafter allows to upgrade the hydrogen-containing fumes produced.

BACKGROUND OF THE INVENTION

Tests intended for integration of a chemical loop in hydrocarbon conversion plants have been carried out.

Patent FR-2,850,156 describes the principle of chemical looping combustion, in a method dedicated to coal combustion.

Document US-2007/703,526 describes an improvement of the chemical loop in an integrated-combustion petroleum hydrocarbon conversion plant allowing $CO_2$ capture, comprising a catalytic cracking reactor in the presence of fluidized catalysts and a catalyst regenerator through combustion of the coke settled on these particles. The regenerator is an oxygen support reduction reactor and it is supplied with solid fuel and/or petroleum residues comprising the coke-containing catalysts. The reduction reactor is associated with an oxidation reactor. The oxygen support circulates between the two reactors. The reduction reactor is a circulating fluidized bed that is fluidized by water vapour and/or recycled $CO_2$ and/or $SO_2$. This patent describes a method with a three-reactor layout. However, the oxidizing masses only circulate between two reactors and the goal is total combustion of the fuel.

Document US-2007/082,089 A2 describes a three-stage method highlighting the use of metallic oxides recirculation for hydrogen production. In a first reactor, total combustion of the fuel allows to produce $CO_2$, $H_2O$. Hydrogen production is performed by re-oxidizing the metallic oxide by means of water vapour. This method requires high vapour flow rates, and it is therefore necessary to heat and to evaporate a large amount of water prior to feeding it into the oxidation reactor, which leads to limitations as regards the energy balance.

Hydrogen production can be achieved through gasification: patent application 2008/036,902 describes for example a hydrocarbon gasification method that is implemented in a conventional layout with two reaction zones.

However, a problem that faces the person skilled in the art wanting to produce syngas (therefore hydrogen) by gasification is the kinetics of the reactions that take place in the gasification reactor, as well as the high reaction temperatures in the gasification reactor. The residence time required for the reactants is thus long. This directly affects the size of the plants and, more specifically, the size of the reactors involved, which leads to high investment costs.

DESCRIPTION OF THE INVENTION

The present invention allows to solve most of the aforementioned drawbacks and it provides an integrated method, optimized in terms of energy cost and equipment, for simultaneous syngas and energy production.

The invention is based on the production of syngas in a gasification reaction zone located between the air reactor (or oxidation reaction zone) and the fuel reactor (or reduction reaction zone), using the catalytic capacity of the metallic oxides in order to lower the temperature and the gasification endothermicity, and to raise the rate of the reactions promoting the production of a concentrated $H_2/CO$ mixture at the outlet.

Air reactor R1 is used here to oxidize the reduced metallic oxides and to provide energy in an amount at least equal to the energy required for activation of the reduction and gasification reactions. No syngas or hydrogen production is achieved in this reactor.

The reduction and gasification reactions take place in two distinct reaction zones of the chemical loop of the method according to the invention, R2 and R3 respectively.

Besides, using the catalytic capacity of the oxygen carriers and, more specifically, of the metals they contain allows to speed up the kinetics of the reactions that take place in the gasification reactor and to reduce the reaction temperatures in the gasification reactor while decreasing the activation energy. The residence time required for the reactants is thus reduced. This directly affects the size of the plants and more specifically the size of the reactors involved. Reduction of the operating temperatures in the gasification reactor induces a better energy balance and a reduction in the investment cost due to the decrease in the thermo-mechanical stresses on the materials.

SUMMARY OF THE INVENTION

The invention relates to a method of producing syngas in at least one chemical loop comprising at least three distinct oxidation, reduction, gasification reaction zones, comprising:

a) carrying out oxidation of the reduced metallic oxides MeO1-x in an air-supplied oxidation reaction zone R1;

b) carrying out combustion of a solid and/or liquid and/or gaseous hydrocarbon feed through at least partial reduction of the metallic oxides MeO in a reduction reaction zone R2 so as to produce a gaseous $CO_2/H_2O$ mixture;

c) carrying out catalytic gasification of a solid and/or liquid hydrocarbon feed by means of the at least partly reduced metallic oxides from R2 in a gasification reaction zone R3 so as to produce a $CO+H_2$ syngas;

and wherein the energy released through oxidation of the metallic oxides in oxidation reaction zone R1 allows the gasification and reduction reactions to be activated.

The two reaction zones R2 and R3 can be located in two distinct reactors or in two distinct reaction zones of a single reactor.

The oxygen $O_2$ required for gasification can be provided at least partly by the metallic oxides when they are partly reduced and/or by the $CO_2/H_2O$ gaseous mixture from reduction reaction zone R2. In an embodiment, exportable excess energy is recovered by heat exchange within the reaction zones or on the gaseous effluents.

In cases where the feed supplying gasification zone R3 is a solid feed, separation is advantageously performed between the ashes and the metallic oxide particles from gasification zone R3, and reduction zone R1 is supplied with the separated metallic oxide particles.

In an embodiment, at least part of the $CO+H_2$ syngas produced in gasification zone R3 is fed into the reduction reactor.

In a variant of the method, at least part of the $CO+H_2$ syngas produced in gasification zone R3 and at least part of the water resulting from the condensation of the $CO_2+H_2O$ stream from combustion zone R2 supply a water gas shift unit WGS in order to produce $CO_2+H_2$.

In another variant, the gases produced in the gasification zone are intended, after purification, to be fed at least partly into a fuel cell.

In a last variant, the gases produced in the gasification zone are, after purification, intended to be fed at least partly into a Fischer-Tropsch type hydrocarbon synthesis unit or a methanol synthesis unit or a dimethylether synthesis unit.

DETAILED DESCRIPTION

The invention relates to an integrated oxidation, reduction and gasification method for chemical looping syngas production.

This optimized chemical looping combustion method is suited for the combustion of liquid hydrocarbons and notably of heavy and/or extra-heavy or bituminous residues, and it involves gasification of the liquid or solid fuels, which allows production, simultaneous or not, of hydrogen (or of syngas) and of energy in the same chemical loop. Energy production can be limited to the energy needs of the chemical loop (energy self-sufficiency), or it can exceed these needs and allow external use of the excess energy produced.

Principle of Chemical Looping Combustion

Chemical looping combustion consists in contacting a hydrocarbon feed with a metallic oxide at high temperature. The metallic oxide then yields part of the oxygen it contains, which takes part in the combustion of the hydrocarbons. After this combustion, the fumes contain predominantly carbon oxides, water and possibly hydrogen. In fact, it is not necessary to contact the air with the hydrocarbon, and the fumes are thus predominantly made up of combustion gases and possibly of a dilution gas used for transport and fluidization of the particles (water vapour for example). It is thus possible to produce predominantly nitrogen-free fumes with high $CO_2$ contents (above 90 vol. %) allowing to consider $CO_2$ capture, then storage. The metallic oxide that has taken part in the combustion is then carried to another reaction enclosure where it is contacted with air in order to be re-oxidized. If the particles coming back from the combustion zone are free of fuel, the gases from this reaction zone are predominantly free of $CO_2$, which is then only present as traces, for example at concentrations below 1 to 2 vol. %, and they essentially consist of oxygen-depleted air, as a result of the oxidation of the metallic particles.

The feeds usable for chemical looping combustion are generally hydrocarbons (natural gas, liquid petroleum feeds, preferably petroleum residues characterized by the fact that less than 10% of these residues have their boiling point under atmospheric conditions above 350° C., or conversion residues, generally resulting from hydroconversion processes or asphalts, deasphalting residues, or solid feeds such as coal or the coke resulting from coking processes).

Implementing a chemical looping combustion method requires large amounts of metallic oxide in contact with the fuel. These metallic oxides are generally contained either in ore particles, or in particles resulting from industrial treatments (residues from the iron and steel industry or from the mining industry, used catalysts from the chemical industry or refining). It is also possible to use synthetic materials such as, for example, alumina or silica-alumina supports on which metals that can be oxidized (nickel oxide for example) have been deposited.

The metallic oxides usable for chemical looping combustion are generally Fe, Ti, Ni, Cu, Mg, Mn, Co, V oxides, used alone or in admixture. These metals can come in form of natural ores (such as ilmenite) or deposited on a synthetic support or on a used catalyst. Preferably, these solids are conditioned in powder form, with a Sauter diameter preferably ranging between 30 and 500 microns, and a grain density ranging between 1400 and 8000 kg/m³, preferably between 1400 and 5000 kg/m³.

According to the metallic oxide used, the amount of oxygen theoretically available varies considerably and it can reach high values close to 30%. However, depending on materials, the maximum capacity of oxygen really available does generally not exceed more than 20% of the oxygen present. The capacity of these materials to yield oxygen does therefore globally not exceed more than some percents by weight of the particles and it varies considerably from one oxide to another, generally ranging from 0.1 to 15%, often from 0.3 to 13 wt. %. Implementation in fluidized bed mode is therefore particularly advantageous for conducting the combustion. In fact, the finely divided oxide particles circulate more readily in the combustion and oxidation reaction enclosures, and between these enclosures, if the properties of a fluid are conferred on the particles (fluidization).

An oxygen carrier is characterized by its oxygen carrying capacity, i.e. the amount of oxygen this carrier can reversibly exchange with the reaction medium between its most oxidized and least oxidized state. X is defined as the fraction of the total capacity of transfer of the oxygen remaining in the oxide and $\Delta X$ is defined as a fraction of the total oxygen transfer capacity. An oxygen carrier is a solid that, in addition to its oxygen-carrying capacity, is able to spontaneously release its oxygen in gas form in the reaction medium without the latter being necessarily reducing.

Chemical looping combustion allows to produce energy, in form of vapour or electricity for example. The feed combustion heat is similar to that encountered in conventional combustion. It corresponds to the sum of the reduction and oxidation heats in the chemical loop. The distribution among the reduction and oxidation heats greatly depends on the metallic oxides used for conducting the chemical looping combustion. In some cases, the exothermicity is distributed among the oxidation and the reduction of the metal. In other cases, the oxidation is highly exothermic and the reduction is endothermic. In any case, the sum of the oxidation and reduction heats is equal to the combustion heat of the fuel. The heat is extracted by exchangers arranged inside, on the wall or added to the combustion and/or oxidation enclosures, on the fume lines or on the metallic oxide transfer lines.

General Description of the Integrated Method According to the Invention

The integrated method according to the invention allows simultaneous production of syngas and of energy within a single chemical loop.

The method according to the invention is implemented in at least one chemical loop comprising at least three distinct oxidation R1, reduction R2 and gasification R3 reaction zones.

Advantageously, in order to allow external energy recovery, the energy released by the oxidation of the metallic oxides in oxidation reaction zone R1 is greater than the sums of the energies required for the gasification and reduction reactions that take place in gasification zone R3 and reduction zone R2 respectively.

The chemical loop allowing the method according to the invention to be implemented comprises three distinct reaction zones:
1. at least one air-supplied oxidation reaction zone R1, referred to as "air" reactor, where the reaction of oxidation of the metallic oxides takes place after reduction,
2. at least one combustion reduction reaction zone R2, referred to as "fuel" reactor, where the feed combustion reaction takes place in the presence of the oxygen present in the metallic oxides,
3. at least one gasification reaction zone R3, referred to as "gasification" reactor, for gasification of the solid and/or liquid feeds in order to produce a syngas, said gasification being catalysed by the at least partly reduced metallic oxides from R2.

The chemical looping device can also comprise:
4. one or more particle—gas separation devices (cyclones),
5. one or more sealing devices in the connection lines between each reactor allowing circulation of the metallic oxides (devices such as siphons for example),
6. in the case of gasification of the solid fuels, at least one separation device between the metallic oxide particles and the particles of different nature (ashes, unburnt particles) required between the gasification reactor and the air reactor so as to prevent possible mixing of $CO_2$ with the nitrogen in the air reactor.

In a variant of the method, it is possible to carry out the gasification reaction and the reduction reaction in the same reactor, in two distinct reaction zones.

In the method according to the invention, the energy released through the oxidation of the oxygen carrier in "air" reactor R1 is at least equal to the sums of the energies required for the gasification and reduction reactions: thus, the energy released by the oxidation of the oxygen carrier in "air" reactor R1 allows to provide the energy required for activation of the gasification (R3) and reduction (R2) reactions, and to optionally provide an energy that can be used in the process as well as for energy production to the outside (heat and/or electricity).

In the particular case where syngas is supplied the reduction reactor, the reactions in this reactor become exothermic, thus favouring the global energy balance of the chemical loop.

LIST OF THE FIGURES

The method of the invention is illustrated by way of non limitative example by FIGS. 1 to 5.

Figure 1:
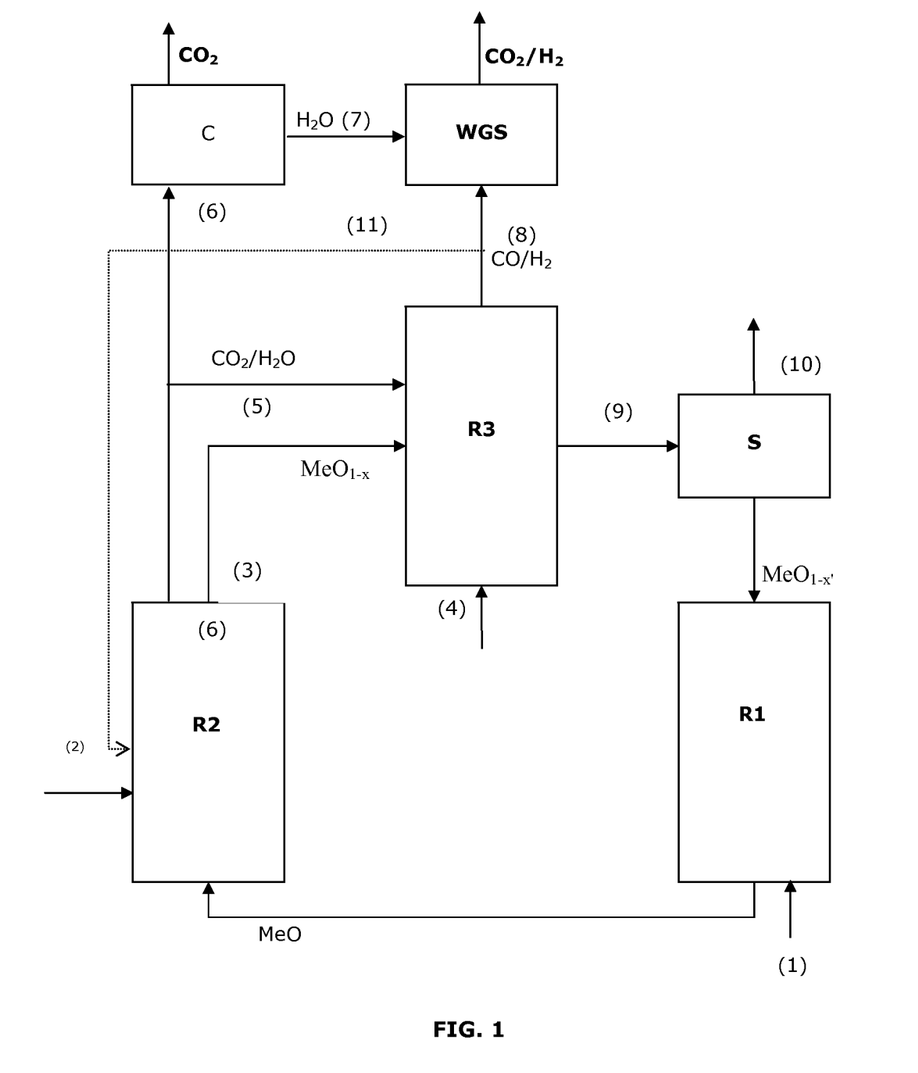
FIG. 1 shows the solid circulation sequence between the reaction zones (in this case consisting of reactors).
Figure 2:
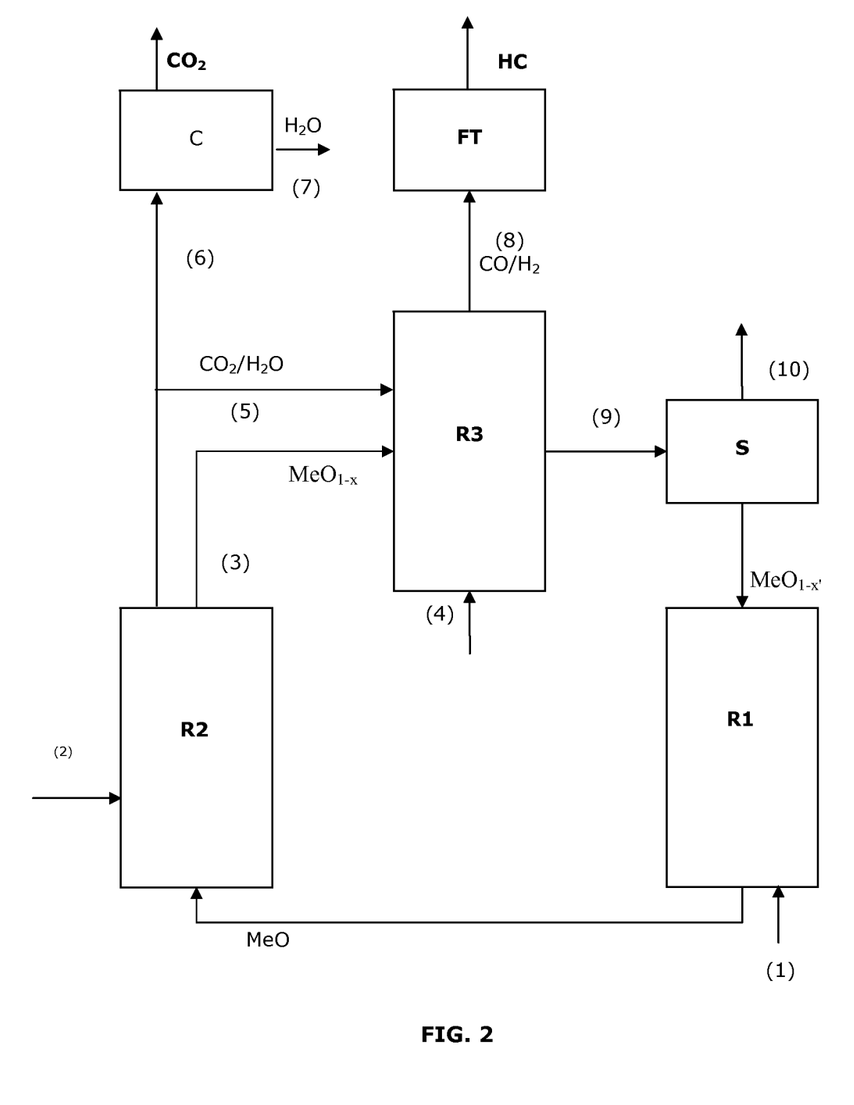
FIG. 2 shows a use of the method according to the invention wherein stream (8) from R3 is sent to a Fischer-Tropsch unit FT in order to produce a hydrocarbon stream HC. In this case, the water from condenser C is discharged through line (7).
Figure 3:
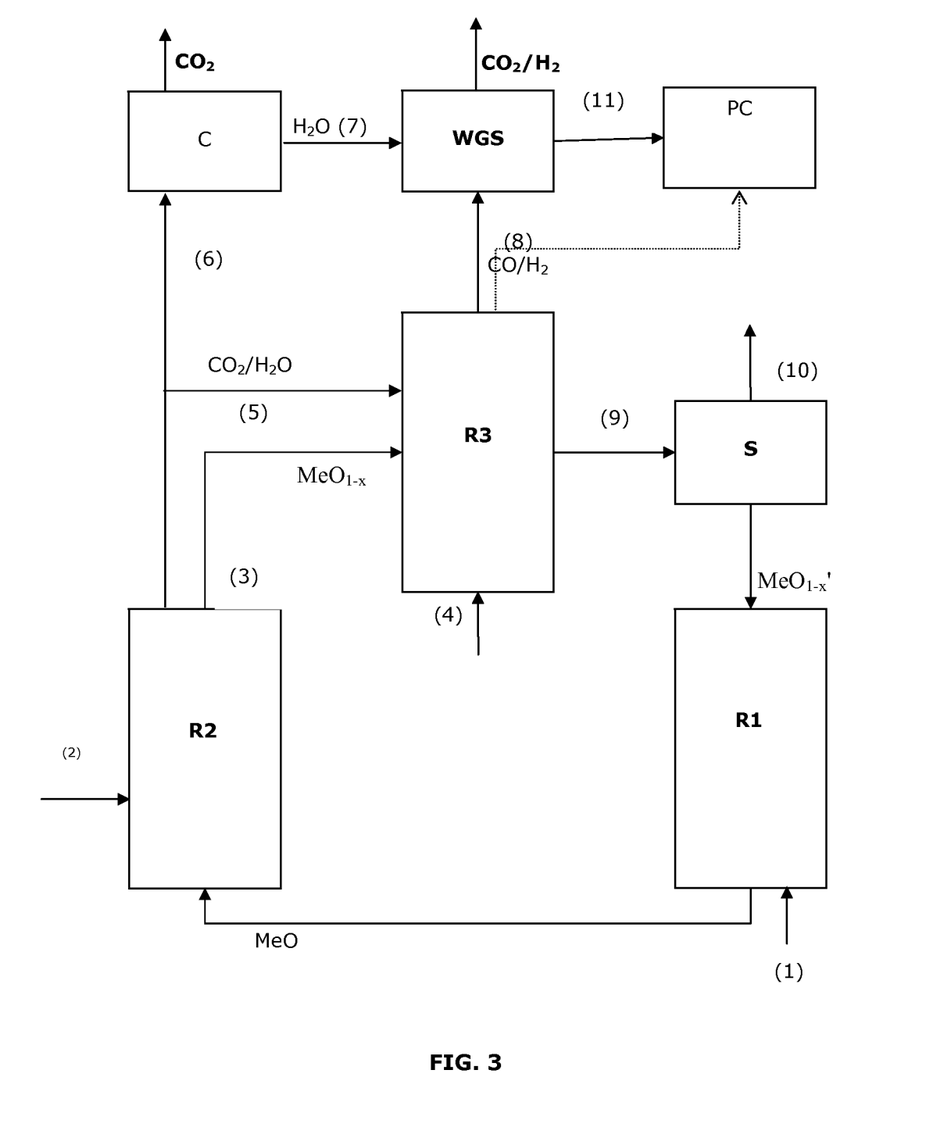
FIG. 3 shows a variant of the method described in FIG. 1 wherein part of the stream from water gas shift unit WGS is fed into a fuel cell PC. Optionally, part of the syngas coming from reactor R3 through line (8) is also fed into the fuel cell so as to produce electricity and/or heat.

A metallic oxide stream circulates from oxidation reactor (or "air" reactor) (R1) supplied with air through a line (1) to reduction reactor (or "fuel" reactor) (R2) wherein combustion of the feed through reduction of the oxygen-carrying materials MeO in their maximum oxidation state, i.e. $0.8 \leq X \leq 1$, preferably $0.95 \leq X \leq 1$, takes place for a precise duration generally ranging between 1 and 15 minutes. The metallic oxides at the outlet of reduction reactor R2 ($MeO_{1-x}$) partly come in metal form, with $0 \leq X \leq 0.5$, preferably $0 \leq X \leq 0.1$, after reaction between the oxygen existing in their structure and the solid and/or liquid and/or gaseous fuel flowing in through line (2). These reduced forms $MeO_{1-x}$ of the metallic oxides circulate through a line (3) of fuel reactor (R2) to gasification reactor (R3) where a reaction of gasification of a solid and/or liquid fuel flowing in through line (4) takes place. This gasification reaction is catalysed by the metallic oxides in reduced form $MeO_{1-x}$, for which $0 \leq X \leq 0.5$, preferably $0 \leq X \leq 0.1$. The gasification reactor is supplied with an oxidizing gas such as $CO_2$ or $H_2O$ and/or a mixture of $H_2O$, $CO_2$ resulting at least partly from the combustion reaction in reactor R2. Gasification reactor (R3) is thus supplied through a line (5) with at least part of the $H_2O$, $CO_2$ and/or with the $CO_2/H_2/H_2O$ mixture coming from the chimney of reduction reactor (R2). The remaining part of the $CO_2$, $H_2O$ and/or of the $CO_2/H_2O$ mixture is sent through line (6) to a condenser C in order to separate the $CO_2$ from the water. The water thus separated can then supply, through a line (7), a water gas shift unit WGS allowing to produce a $CO_2/H_2O$ mixture from the syngas flowing in through a line (8) from reactor R3. At the outlet of reactor R3, the solid particles are sent through a line (10) to a separator S in order to separate the ashes from the metallic oxides $MeO_{1-x}$ that are sent to reactor R1.

The device can also be complemented with sulfur treatment units for sulfur in $H_2S$ and/or $SO_2$ form if the fuel contains sulfur, as well as a $CO_2$-$H_2$ separation unit. These devices are not shown in the figures. Depending on the purpose of the gases obtained with the method, the gases are purified so as to desulfurize the fumes using methods known to the person skilled in the art, in order to reach the requirements for applications downstream from the process described in the invention.

Reduction of the materials referred to as "oxygen-carrying materials" is carried out in the reactor referred to as "fuel" reactor R2 through contact between the materials and the liquid and/or gaseous and/or solid fuel delivered through line (2).

Gasification of a liquid or solid residue (by way of example) is carried out in the reactor referred to as "gasification" reactor R3, said residue being upgraded as syngas $CO/H_2$ under the conditions (temperature, pressure, number of moles of water per mole of fuel) required for gasification and in the presence of the reduced materials $MeO_{1-x}$ having catalytic properties.

The reduced materials $MeO_{1-x}$ are oxidized in air in the reactor referred to as "air" reactor R1 so as to regain their most oxidized state where $0.8 \leq X \leq 1.0$, preferably $0.95 \leq X \leq 1$.

Figure 4:
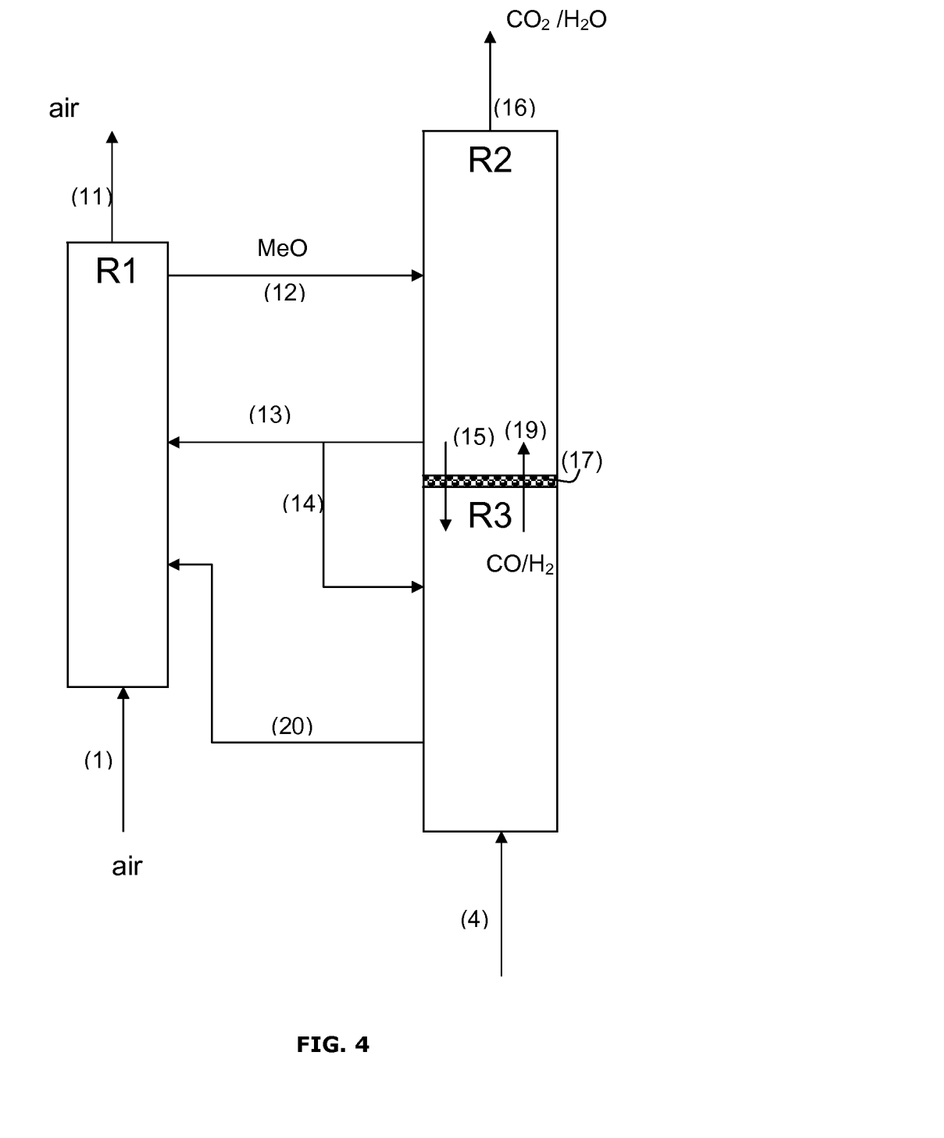
FIG. 4 shows the configuration wherein the gasification reaction and the reduction reaction are conducted in the same reactor, in two distinct reaction zones R3 and R2.

In this configuration, the oxidizing mass in its most oxidized form (12) enters reduction zone R2 where it is contacted with gases (19) coming from zone R3 containing at least partly a ($CO$, $H_2$) mixture that is oxidized to $CO_2$, $H_2O$. The oxidizing masses will furthermore complete the combustion of the hydrocarbons from zone R3 present in the gas phase (19). The fumes of R2 are discharged through a line (16); they essentially contain water and $CO_2$. The water can then be condensed and the $CO_2$ sent to a storage site optionally after a post-treatment allowing for example the $CO_2$ to be purified by desulfurizing the fumes.

The oxidizing masses of zone R2 are then sent to zone R3 where partial combustion of the fuel (4) is carried out through lines (15) or (14). Part of the oxidizing masses can optionally be sent back to air reactor (R1).

One feature of the invention consists in arranging zones R2 and R3 one above the other, It is then possible, by means of particular devices, to allow all the gases from R3 to pass into R2 and the solids from R2 to flow into R3 so that the fuel contacts the oxidizing mass in a counter-current flow as shown in FIG. 4. These particular devices, well known to the person skilled in the art, are for example internals such as perforated plates or baffles.

The solid from R3 is recycled to R1 through line (20).

The residence time of the metallic oxides in fuel reactor (R2) depends on the nature of the fuel and it can generally be estimated between 30 s and 10 minutes, preferably between 1 and 8 minutes.

The residence time of the metallic oxides in air reactor (R1) depends on the oxidation and/or reduction state of these oxides and it can generally be estimated between 30 s and 10 minutes, preferably between 1 and 3 minutes.

The residence time of the metallic oxides in the gasification reactor depends on the nature of the fuel to be gasified and it can generally be estimated between 1 and 20 minutes, preferably between 1.5 minute and 10 minutes.

Specific Advantages of the Invention

Several specific advantages of the method according to the invention are mentioned below by way of non limitative example.

The invention allows, through the use of oxidizing masses in a chemical loop, to combine energy production and hydrogen production (or more generally syngas production) in the same chemical loop.

The chemical loop of the method according to the invention not only allows to produce the energy required for syngas production, but it also optionally allows to produce energy exploitable in form of heat and/or electricity.

Furthermore, in a particular embodiment of the invention, the optional supply of part of the syngas produced in the gasification reactor to the reduction reactor induces exothermic reactions in this reactor, thus favouring the global energy balance of the invention (FIG. 1, (11)).

The method according to the invention allows to use the catalytic capacity of the metallic oxides reduced at the outlet of reduction reactor (R2) in gasification reaction (R3). The gasification reaction is thus catalysed by the metallic oxides without any external catalyst supply.

Besides, the method according to the invention allows to directly inject heavy feeds in contact with the oxygen carrier into the reduction reactor ("fuel" reactor R2).

The integrated method according to the invention finally allows to avoid long residence times for the solid fuel/metallic oxides in the reduction reactor ("fuel" reactor), which are generally of the order of 15 to 20 minutes. In fact, these residence times are long and they usually involve large-size reactors.

Example

Figure 5:
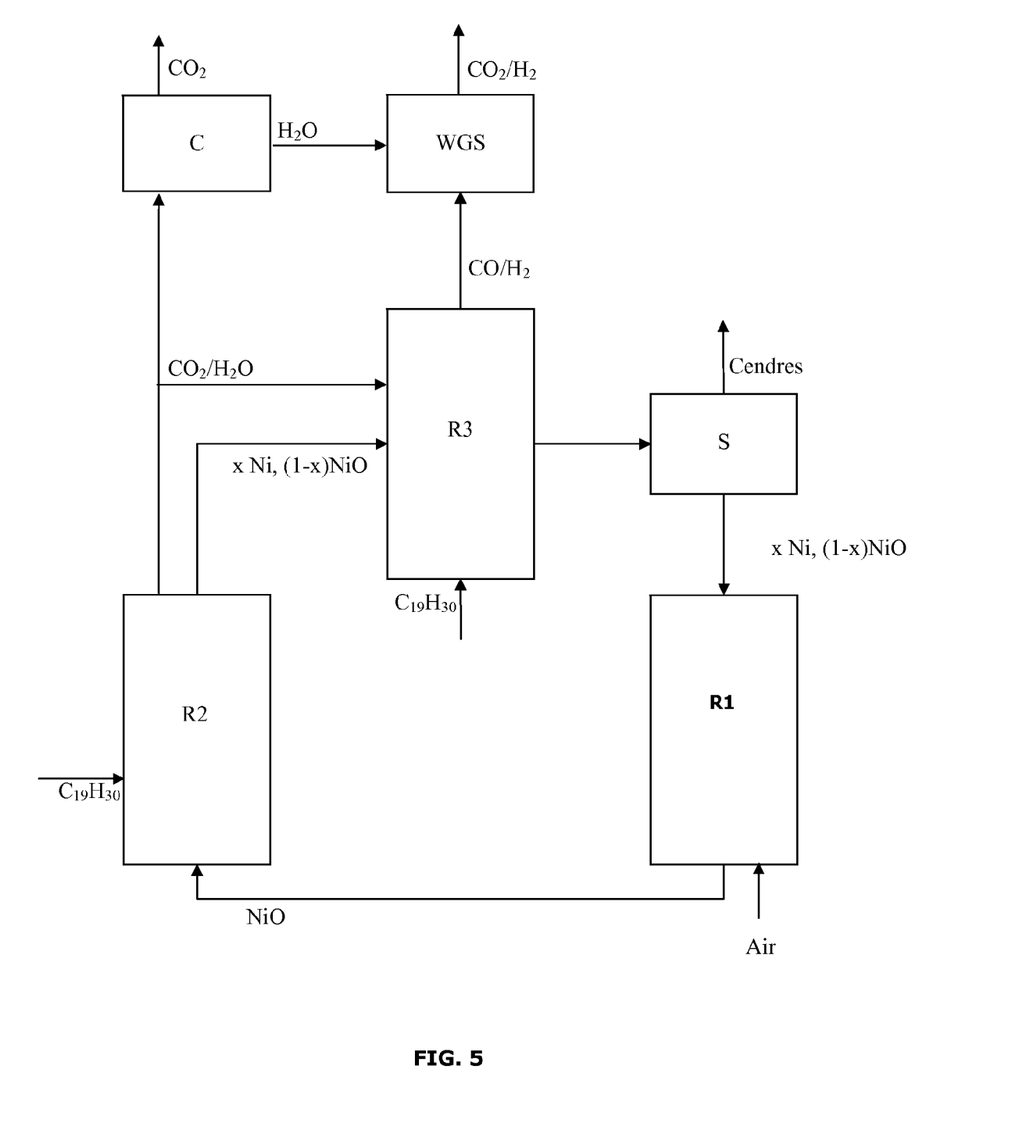
FIG. 5 shows the method according to the invention in the same configuration as in FIG. 1, in the case of the example given hereafter, Operating Conditions Advantageously, the reactions in the "air" (R1), "fuel" (R2) and "gasification" (R3) reactors take place at a temperature ranging between 700° C. and 1200° C., preferably between 750° C. and 950° C.

The example below (shown in FIG. 5) uses the operating principle with three distinct reactors of the present invention as shown in FIG. 1:

reduction of the materials referred to as "oxygen-carrying materials" is carried out in the reactor referred to as "fuel" reactor through contact between the materials and a liquid and/or gaseous and/or solid fuel, gasification of a fuel (a liquid or solid residue by way of example) is carried out in a distinct reactor referred to as "gasification" reactor, said residue being upgraded as syngas under the conditions (T and P, number of moles of water per mole of fuel) required for gasification and in the presence of the reduced materials having catalytic properties, the reduced materials are oxidized by air in the reactor referred to as "air" reactor.

In this example, we calculate an energy balance and a material balance representing the system at energy equilibrium, i.e. in a situation where the energy released through oxidation of the oxygen carrier in the "air" reactor is sufficient not only to activate the gasification and reduction reactions, but also to provide a heat exploitable at the level of the process as well as for heat production.

The operating conditions considered in each stage are as follows:
Gasification
1) the gasification reaction is complete: CO and $H_2$ are the only reaction products;
2) the fluidization parameters are not taken into account;
3) the reactants are solid or liquid feeds and water vapour;
4) the reaction is endothermic.
Metallic Oxide Reduction
1) the reduction reaction is complete with respect to the fuel. The reaction products are $CO_2$ and $H_2O$;
2) the exchange is ideal between the oxygen carrier and the liquid fuel: there is no diffusion limitation, no carbon formation, no reactivity loss;
3) the reaction is endothermic.
Metallic Oxide Oxidation
1) the oxidation reaction is complete;
2) the exchange is ideal between the oxygen carrier and the air;
3) the reaction is exothermic.
More particularly, the present example considers:
the combustion of the liquid fuel $C_{19}H_{30}$, which constitutes as a first approach a case similar to domestic fuel,
the selection of NiO as the oxygen carrier, the complete reduction reaction being then:

$$53NiO + C_{19}H_{30} \rightarrow 19CO_2 + 15H_2O + 53Ni$$

the reduced form of the oxygen carrier as being Ni, the complete oxidation reaction then is:

$$Ni + 0.5O_2 \rightarrow NiO$$

gasification is carried out at atmospheric pressure.

The system is considered to be at energy equilibrium, however the system has a dynamic character since the solid oxygen carrier continuously circulates between the various reactors of the system. The calculations take into account the evolution of the properties of the amount of solid oxygen carrier required for conversion of 100 $Nm^3/h$ vaporized liquid feed $C_{19}H_{30}$.

Numerical Values:

| Heat of formation | $kJ \cdot mol^{-1}$ |
|---|---|
| $\Delta H_f(H_2O)$ | −241.6 |
| $\Delta H_f(CO_2)$ | −393.12 |
| $\Delta H_f(CO)$ | −110.5 |
| $\Delta H_f(H_2)$ | 0 |
| $\Delta H_f(O_2)$ | 0 |
| $\Delta H_f(NiO)$ | −240 |
| $\Delta H_f(C_{19}H_{30})$ | −640 |

In the Fuel Reactor $$53NiO + C_{19}H_{30} \rightarrow 19CO_2 + 15H_2O + 53Ni$$

$\Delta H_r(\text{fuel}) = 2266$ $kJ/mol_{C_{19}H_{30}} = 52.7$ $kJ/mol_{NiO}$

Calculation of the amount of solid $\dot{m}_{NiO}$ required to convert 100 $Nm^3/h$ vaporized fuel:
under stoichiometric conditions (C/O=0.36)

$\dot{m}_i$ the mass flow of compound i
$\dot{n}_i$ the mass flow of compound i
$M_i$ the molar mass of compound i With a RoDX (mobilizable oxygen mass per gram of catalyst) of 0.01 gO/gNiO, $$\dot{m}_{NiO_{total}} = \frac{\dot{m}_O}{RoDX} = 379.2 \, t \cdot h^{-1}$$

power required for conversion of the 100 $Nm^3/h$ $P_{fuel} = \dot{n}_{C_{19}H_{30}} \cdot \Delta H_r(\text{fuel})_{C_{19}H_{30}} = 2.81$ MW.

In the Gasification Reactor $$19H_2O + C_{19}H_{30} \rightarrow 19CO + 34H_2$$

$\Delta H_r(\text{gasification}) = 3130$ $kJ/mol_{C_{19}H_{30}}$
Power required for the conversion of 50 $Nm^3/h$ $P_{gaz} = \dot{n}_{C_{19}H_{30}} \cdot \Delta H_r(\text{gasification})_{C_{19}H_{30}} = 1.94$ MW This value does not take account of the catalytic activity of the solid and it represents a high estimation of the energy required for gasification.

In the Air Reactor $$Ni + 0.5O_2 \rightarrow NiO$$

$\Delta H_r(\text{oxidation}) = -240$ $kJ/mol_{Ni}$
Power provided by the regeneration of 65.7 mol/s catalyst by oxidation:

$P_{air} = \dot{n}_{Ni} \cdot \Delta H_r(\text{oxidation})_{Ni} = -15.8$ MW.

Balance

The calculation thus detailed (see above) allows to establish an energy balance of the reactions that take place in the various reactors of the invention. This balance only takes account of the reaction heats. The global balance takes account of the heats required to heat the reactants and of the heat recoverable on the fluids at the outlet of the reactors involved, i.e.:
$P = -6.7$ $MW_{th}$ for a circulating solid amount of 379.2 t/h,
i.e. a thermal efficiency of 25% (not taking into account $H_2$ and CO valorization), an efficiency calculation based on the NCV of the domestic fuel (26.8 MW). The hydrogen production in parallel is 152 kg/h. The temperature differential between the temperature of the oxidized solid leaving the oxidation reactor and the temperature of the solid entering the reactor in partly reduced state after use of the heat is of the order of 70° C. for a maximum temperature of the order of 1100° C.

The invention claimed is:
1. A method of producing syngas in at least one chemical loop comprising at least three distinct oxidation, reduction, gasification reaction zones, comprising:
1) carrying out oxidation of reduced metallic oxides in an air-supplied oxidation reaction zone R1;
2) carrying out combustion of a solid and/or liquid hydrocarbon feed through at least partial reduction of metallic oxides in a reduction reaction zone R2 so as to produce a gaseous $CO_2/H_2O$ mixture;
3) supplying a gasification reaction zone R3 through a line with at least part of the $CO_2/H_2O$ mixture coming from reaction zone R2, and sending the remaining part of the $CO/H_2O$ mixture through another line to a condenser in order to separate the $CO_2$ from $H_2O$; and
4) carrying out catalytic gasification of a solid and/or liquid hydrocarbon feed by means of the at least partly reduced metallic oxides from R2 in the gasification reaction zone R3 so as to produce a $CO+H_2$ syngas, wherein a fraction of the total capacity of transfer of the oxygen remaining in the at least partly reduced metallic oxides from R2 is from 0 to 0.5;

wherein the energy released through oxidation of the metallic oxides in oxidation reaction zone R1 allows the gasification and reduction reactions to be activated.

2. A method as claimed in claim 1, wherein the two reaction zones R2 and R3 are located in two distinct reactors.

3. A method as claimed in claim 1, wherein the two reaction zones R2 and R3 are two distinct reaction zones of a single reactor.

4. A method as claimed in claim 1, wherein the oxygen $O_2$ required for gasification is provided at least partly by the metallic oxides when they are partly reduced and/or by the $CO_2/H_2O$ gaseous mixture from reduction reaction zone R2.

5. A method as claimed in claim 1, wherein exportable excess energy is recovered by heat exchange within the reaction zones or on gaseous effluents from the reaction zones.

6. A method as claimed in claim 1, in cases where the feed supplying gasification zone R3 is a solid feed, separation is performed between the ashes and the metallic oxide particles from gasification zone R3, and air-supplied oxidation reaction zone R1 is supplied with the separated metallic oxide particles.

7. A method as claimed in claim 1, wherein at least part of the $CO+H_2$ syngas produced in gasification zone R3 is fed into the reduction reaction zone R2.

8. A method as claimed in claim 1, wherein at least part of the $CO+H_2$ syngas produced in gasification zone R3 and at least part of the water resulting from the condensation of a $CO_2+H_2O$ stream from reduction reaction zone R2 supply a water gas shift unit WGS in order to produce $CO_2+H_2$.

9. A method as claimed in claim 1, wherein the gases produced in the gasification zone are intended, after purification, to be fed at least partly into a fuel cell.

10. A method as claimed in claim 1, wherein the gases produced in the gasification zone are, after purification, intended to be fed at least partly into a Fischer-Tropsch type hydrocarbon synthesis unit or a methanol synthesis unit or a dimethylether synthesis unit.

11. A method as claimed in claim 1, wherein the fraction of the total capacity of transfer of the oxygen remaining in the at least partly reduced metallic oxides from 0 to 0.1.

* * * * *